United States Patent
Chen et al.

(10) Patent No.: US 11,256,670 B2
(45) Date of Patent: Feb. 22, 2022

(54) MULTI-DATABASE SYSTEM

(71) Applicant: FUJITSU LIMITED, Kawasaki (JP)

(72) Inventors: Wei-Peng Chen, Fremont, CA (US); Lei Liu, San Jose, CA (US); Takuki Kamiya, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 453 days.

(21) Appl. No.: 15/965,937

(22) Filed: Apr. 29, 2018

(65) Prior Publication Data
US 2019/0332696 A1    Oct. 31, 2019

(51) Int. Cl.
  *G06F 16/21*    (2019.01)
  *G06F 16/2455*  (2019.01)

(52) U.S. Cl.
  CPC ........ *G06F 16/211* (2019.01); *G06F 16/2455* (2019.01)

(58) Field of Classification Search
  CPC .......................... G06F 16/2455; G06F 16/211
  See application file for complete search history.

(56) References Cited

U.S. PATENT DOCUMENTS

| | | | |
|---|---|---|---|
| 7,739,224 B1* | 6/2010 | Weissman | G06F 16/283 707/794 |
| 8,065,336 B2 | 11/2011 | Armstrong et al. | |
| 9,355,160 B2 | 5/2016 | Wolfram et al. | |
| 9,734,252 B2 | 8/2017 | Wolfram et al. | |
| 2002/0174011 A1* | 11/2002 | Sanchez | G06Q 30/0238 705/14.25 |
| 2014/0282912 A1 | 9/2014 | Quigg et al. | |
| 2015/0074101 A1* | 3/2015 | Solheim | G06F 16/3338 707/732 |
| 2015/0178342 A1* | 6/2015 | Seering | G06F 16/254 707/754 |
| 2018/0150894 A1* | 5/2018 | Srivastava | G06Q 30/0625 |

(Continued)

FOREIGN PATENT DOCUMENTS

WO    2017051420 A1    3/2017

OTHER PUBLICATIONS data.gov (Retrieved: Apr. 26, 2018). The home of the U.S. Government's open data. Retrieved from: https://www.data.gov/.

(Continued)

*Primary Examiner* — Kris E Mackes
(74) *Attorney, Agent, or Firm* — Maschoff Brennan

(57) ABSTRACT

A method may include obtaining metadata associated with first and second data sets that may be stored at remote computing devices. The method may also include constructing a first database based on the metadata, and performing a first processing task on the first data set. The first processing task may include obtaining raw data of the first data set, and importing the raw data of the first data set into a second database that may be configured as a relational database. The first processing task may also include generating relationships in the second database between entries of the first data set to facilitate anticipated responses to queries. The method may additionally include performing a second processing task different from the first processing task on the second data set, and after performing the first processing task, receiving a query that invokes the first data set, and responding to the query.

20 Claims, 5 Drawing Sheets

(56) References Cited

U.S. PATENT DOCUMENTS

2018/0157710 A1* 6/2018 Guirguis ................ G06F 16/27

OTHER PUBLICATIONS

EU Open Data Portal (Retrieved: Apr. 26, 2018). Open Data Portal. Retrieved from: http://data.europa.eu/euodp/en/data.
GitHub (Retrieved: Apr. 26, 2018). Socrata-analysis. Retrieved from: https://github.com/tlevine/socrata-analysis.
Malyon, Paul (Jan. 19, 2017) Overcoming the 3 obstacles of Open Data. Retrieved from: https://www.edq.com/uk/blog/overcoming-3-obstacles-of-open-data/.
Pollock, Rufus (Retrieved: Jul. 21, 2020). A catalog of data portals around the world. Retrieved From: http://dataportals.org/.

* cited by examiner

MULTI-DATABASE SYSTEM

FIELD

The embodiments discussed in the present disclosure are related to a multi-database system.

BACKGROUND

Large data sets are difficult to access or manage. Despite the advancements in networking and processing capabilities, it is still an expensive proposition to access or process large data sets. Furthermore, different data sets may use different formats which may make it difficult to utilize different sources of data sets.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a method. The method may include obtaining metadata associated with a first data set and a second data set, where the first and second data sets may be stored at remote computing devices. The method may also include constructing a first database based on the metadata of the first and second data sets, and performing a first processing task on the first data set. The first processing task may include obtaining raw data of the first data set, and importing the raw data of the first data set into a second database, where the second database may be configured as a relational database. The first processing task may also include generating relationships in the second database between entries of the first data set to facilitate anticipated responses to queries. The method may additionally include performing a second processing task on the second data set, where the second processing task may be different from the first processing task. The method may additionally include, after performing the first processing task, receiving a query that invokes the first data set, and responding to the query based on the relationships generated in the second database.

The object and advantages of the embodiments will be realized and achieved at least by the elements, features, and combinations particularly pointed out in the claims.

It is to be understood that both the foregoing general description and the following detailed description are merely examples and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
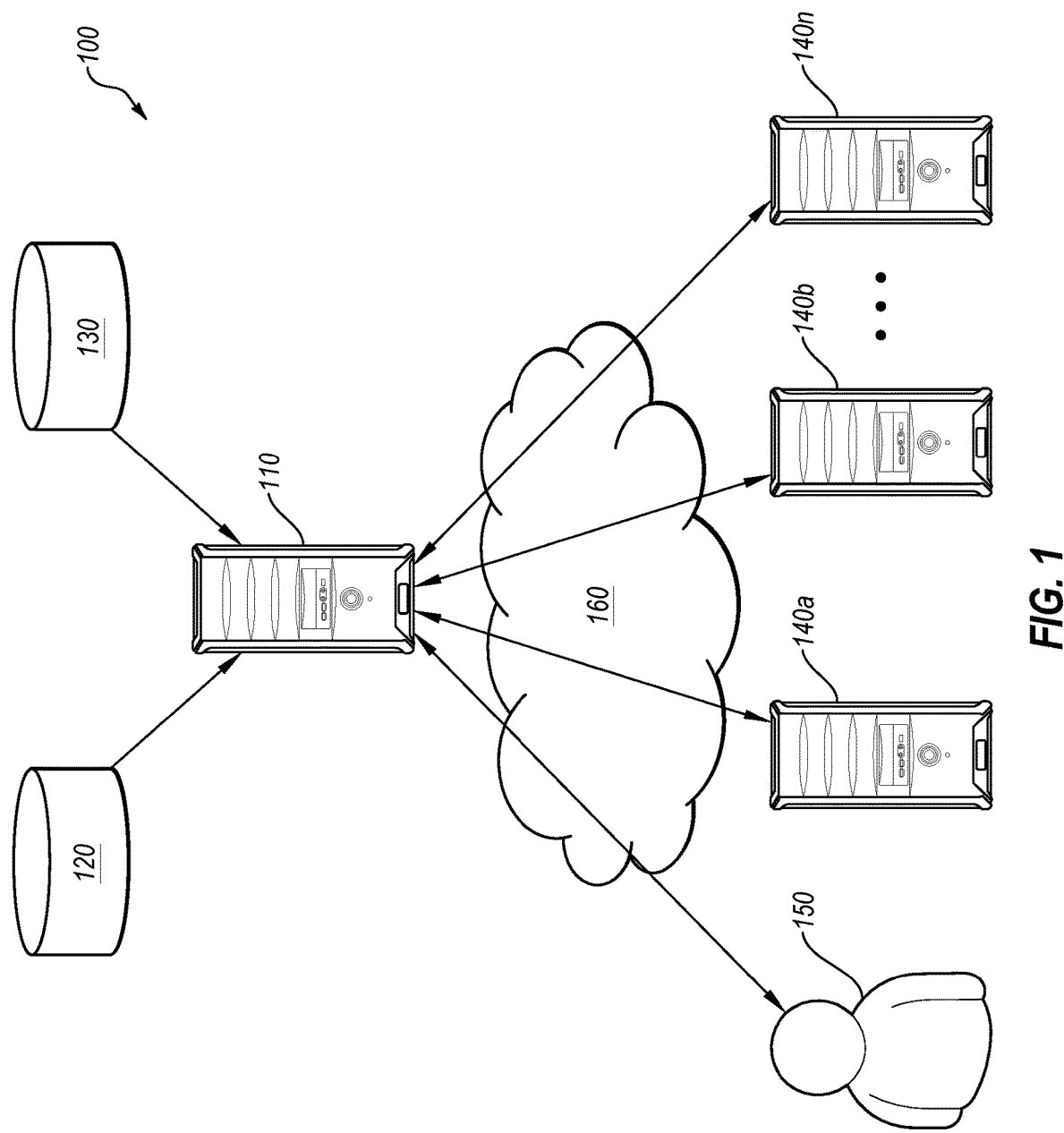
FIG. 1 illustrates an example implementation of a multi-database system.

The present disclosure relates to, inter alia, the use of multiple databases to facilitate the analysis and access to data sets. For example, there are large number of very large open data sets (sometimes referred to as Big Data) where government entities or other groups that collect large amounts of data make that data available. However, due to the large number of data sets, the large amount of data in each data set, and the difficulty in handling or accessing such data, many data sets remain unused.

To facilitate the access to such large data sets, the present disclosure contemplates the use of a database management device to facilitate the collection of information regarding data portals via which data sets may be accessed, and the acquisition of metadata regarding various data sets, without necessarily acquiring the raw data itself. For example, the metadata of various data sets may be acquired and used to construct a first, graph-based database. Based on a priority of the data sets, certain processing tasks may be performed on the data sets before receiving queries regarding the raw data in the data sets. For example, for high priority data sets, the raw data may be obtained, a variety of analyses may be performed on the raw data, and/or visualizations of the data and/or analyses may be generated and stored to facilitate rapid responses to queries that invoke such high priority data sets. As another example, for low priority data sets, little or no processing may be performed before receiving a query, e.g., the metadata of the low priority data set may be retained but the raw data may not be acquired unless a query from a user to the database management device invokes the low priority data set. In these and other embodiments, the raw data and/or the outputs of the processing tasks may be stored in a second, relational database.

The use of a multi-database system may provide a number of benefits to the operation of a computer itself, and to networks communicating associated data sets. With respect to the computer itself, the storage of the metadata alone for lower priority data sets rather than all of the raw data provides a large space savings. Also, the performance of processing tasks before receiving a query allows for the computer to provide a rapid response to such queries without having to perform excessive processing on large amounts of data before providing a response. Additionally, by scheduling such processing tasks based on cost, the processing may be performed at a time when the computing load is low and when networking resources are low. Thus, the processing, which is likely to occur anyway for high priority data sets, is able to occur at more efficient times. Thus, embodiments of the present disclosure may improve the performance of a computer itself.

With respect to improving the operation of a network, the multi-database system also improves the operation of a network, allowing for reduced network bandwidth requirements, thus preserving valuable network resources. By way of example, rather than each user desiring to perform an analysis on a large data set, the user may query the database management system and the result of the query, rather than the raw data itself, may be sent in response to the query. Thus, rather than the network usage being multiplied by the number of users interested in a particular data set, the data set may be downloaded a single time and the much smaller resulting analysis may be sent to each of the users. Thus, embodiments of the present disclosure may improve the functioning of the network by preserving network resources.

Additionally, the present disclosure provides improvements to the field of large data sets. For example, as described above, the present disclosure provides an increase in efficiency and response time in users accessing and performing analyses on large data sets. Because of an increase in efficiency and response time, users are more likely to be willing to utilize large data sets. Thus, the present disclosure not only provides an improvement to the computers hosting and performing analyses on large data sets, the increased use and user acceptance of large data sets provides a corresponding improvement to the field of large data sets.

Embodiments of the present disclosure are explained with reference to the accompanying drawings.

FIG. 1 illustrates an example implementation of a multi-database system 100, in accordance with one or more embodiments of the present disclosure. The system 100 may include a database management device 110 that may be configured to coordinate the acquisition and/or access of various data sets for the inclusion of such data sets in various databases. The database management device 110 may be in communication with a first database 120 and a second database 130. In some embodiments, the database management device may communicate with one or more remote computing devices 140 (such as the remote computing devices 140a, 140b, . . . , 140n) storing various data sets. In these and other embodiments, the database management device 110 may receive and respond to queries from a user 150 that invokes one or more of the data sets stored at the remote computing devices 140. The system 100 may include a network 160 to facilitate communication between the various components of the system 100.

In some embodiments, the database management device 110 may be configured to facilitate the generation and maintenance of the databases 120 and 130. For example, the database management device 110 may facilitate the analysis of metadata regarding data sets, the obtaining of such metadata, the correction of incorrect information in such metadata, the construction of additional fields of metadata, and the construction of the first database 120. The database management device 110 may additionally facilitate the acquisition of raw data from the data sets, performing processing on the data sets before the reception of queries from the user 150, and storing the results of the processing in the second database 130. Additionally or alternatively, the database management device 110 may perform processing on the data sets in response to queries from the user 150.

In some embodiments, the analysis of the metadata by the database management device 110 may include the retrieval of entries from one or more projects that accumulate lists of available data portals where data sets may be accessed. Such projects may include, for example, the open source project Socrata Analysis, or OpenDataSoft® listings, dataportals.org, etc. In some embodiments, the database management device 110 may crawl or otherwise analyze websites or other public-facing resources for such projects that include pointers to multiple data portals. In these and other embodiments, the database management device 110 may access entries of various data portals and retrieve the entries for the various data portals. The data portals may include any repository or storage device (whether logical or physical) via which one or more data sets and/or metadata for the data portal and/or data sets may be accessed. In these and other embodiments, the data portals, the associated data sets, and/or the associated metadata may be stored or hosted by the remote computing devices 140.

In some embodiments, the database management device 110 may determine the format of a metadata generator for generating the metadata of the data sets available at the various data portals. For example, the database management device 110 may parse or otherwise analyze the entries of the various data portals acquired at the various projects to identify the format for the various data sets of the data portal as explicitly stated in the entries. As another example, the database management device 110 may crawl or otherwise perform a keyword search on a website or other public-facing resource associated with a given data portal for terms associated with a particular format of the metadata generator for data sets. In these and other embodiments, the search may include terms such as "CKAN," "Socrata," DKAN," "Juna," "ArcGIS," etc. If such a term is found, the format associated with the term that was found may be identified as the format of the metadata generator for the data portal. In these and other embodiments, the identified format may be verified by submitting an application programming interface (API) call to the data portal based on the identified format. If the data portal responds appropriately to the API call, the format of the metadata generator for data portal may be confirmed. If the data portal responds with an error or fails to respond to the API call, a search may be continued or data sets of the data portal may be labelled as an unknown or unidentified format.

In some embodiments, if no such terms are found on the website or other public-facing resource, API calls may be submitted by the database management device 110 to attempt to determine the format of the metadata generator for the data portal. For example, if none of the terms associated with the known formats are found, an API call of a first format may be submitted to the data portal. If there is an appropriate response to the API call, the format for the data portal may be updated with the format of the metadata generator associated with the API call. If there is an error or no response, an API call associated with a second format may be submitted. Using such approaches, formats of the metadata generator for the data sets of the data portals may be determined. While described as being determined at the level of a data portal, the present disclosure contemplates determining the format on a data set level such that a given data portal may provide access to multiple data sets of varying formats.

In some embodiments, the database management device 110 may utilize the known format of the metadata generator for a given data portal to retrieve the metadata for the data sets associated with the given data portal. In these and other embodiments, the database management device 110 may send a message to the remote computing device 140 hosting a given data portal to request that the remote computing device 140 provide a list of all data sets available via the given data portal and/or the metadata of such data sets. For example, if the given data portal utilizes the Comprehensive Knowledge Archive Network (CKAN) format, the API call "package_list" may be called to retrieve a list of all data sets available via the given data portal. Using the list returned from the "package_list" API call, the API call "package_show" may be used to access metadata for each of the data sets accessible via the given data portal. In these and other embodiments, the database management device 110 may retrieve a website or other public-facing resource associated with a given data set such that the database management device 110 may locally store both the metadata regarding the given data set and the website/other public-facing resource of the given data set.

In some embodiments, the database management device 110 may utilize the retrieved metadata of the data sets to construct the first database 120. In preparation of constructing the first database 120, the database management device 110 may map various metadata fields from one format into another format such that each of the metadata fields associated with each of the data sets may be contained in a common format. In some embodiments, the database management device 110 may perform such mapping by performing text mining and/or other natural language processing on the headers or other identifiers of the fields of the metadata such that common or similar terms may be identified to map the fields of one format to the fields of the common format. Additionally or alternatively, the mapping may be based on a pre-defined mapping of metadata fields in one format to another format. Such a pre-defined mapping may be obtained from a third party (e.g., as published on a website or released by a body associated with one or more of the formats) or generated, e.g., by an administrator interacting with the database management device 110.

In some embodiments, the database management device 110 may utilize the metadata from the data sets to map the metadata to common fields of the common format. In these and other embodiments, the first database 120 may be constructed by importing the various fields of metadata for the data sets into the first database in the common format. In some embodiments, the metadata for the data sets may be imported into the first database 120 as a graph database such that a set of nodes and edges may exist between and among the various portions of metadata. For example, a field in one data set may be connected to another field of the same or a different data set via an edge in the graph. As another example, data sets that are related to the same category may be connected to an entity of the category. As an additional example, fields from two data sets may represent the same entity semantically, and as such the fields from the two data sets may be connected. In these and other embodiments, the first database 120 may operate to illustrate connections between and among various fields of data and data sets such that the database management device 110 may respond to a query regarding the data sets by identifying the affected fields by identifying them within the first database 120.

In some embodiments, the database management device 110 may facilitate preparation for generation of the second database 130 by expanding or otherwise providing additional information regarding the data sets in the first database 120. In these and other embodiments, the database management device may identify the raw data for each of the various data sets, and store information identifying the location of the raw data as an additional component of metadata regarding the various data sets in the first database 120. For example, if a given data set includes multiple resources of raw data, the first database 120 may be updated with information regarding the location of each of the resources of raw data (e.g., a uniform resource locator (URL) where the raw data may be downloaded) for the given data set.

Any approach may be taken to identify the location of the raw data. In some embodiments, the metadata already stored in the first database 120 may include information regarding the location of the raw data. Additionally or alternatively, a search may be performed on the webpages or other public-facing resources associated with the data sets for words, terms, etc. (e.g., "download," "access," etc.), or file types associated with raw data (e.g., a comma-separated values (CSV) file type, a JavaScript Object Notation (JSON) file type, an Extensible Markup Language (XML) file type, a resource description framework (RDF) file type, a spreadsheet file type (e.g., .xls or .xlsx), a portable document format (PDF) type, or a compressed file type, etc.). In some embodiments, a combination of approaches may be used. For example, those pages identified as having the searched-for terms may be crawled to identify pointers to files of the type associated with raw data. If both conditions are met, the locations of the raw data may be identified as the locations of the files of the type associated with raw data.

In some embodiments, the database management device 110 may verify and/or correct one or more entries of metadata in the first database 120. For example, some metadata may be entered by human users who misinterpret the field meaning or otherwise provide incorrect metadata regarding a data set. For example, pointers to locations of raw data stored in the metadata may be pointers to gateway resources rather than raw data resources (e.g., for a data set regarding street names in a city, an entrance webpage may have URLs for a different web site for each resource for each zip code of multiple zip codes in the city, but the gateway webpage may not have any raw data for downloading). As one example, in a POD format, a "downloadURL" field may include a URL for an entrance webpage via which sites for multiple resources associated with the data set may be accessed, but the URL in the metadata may not point to a location of actual raw data. As another example, in a CKAN format, the "accessURL" field may include a URL for an entrance webpage via which a user may explore various data sets but may not be a URL from which raw data may be downloaded. Additionally or alternatively, a "num_resources" field of metadata may be incorrectly propagated. For example, the URL for an entrance webpage may be provided and a number of resources may be identified as one based on the single entry URL, despite there being multiple resources that are accessed via the single entry URL, each with their own URL to access the actual raw data. In these and other embodiments, the database management device 110 may modify or otherwise correct metadata entries based on crawling/analyzing the metadata to verify the information. For example, if the identified URL where the raw data may be accessed does not include any raw data files, metadata regarding the raw data may be verified. As another example, a URL of a resource may be changed to another location while the metadata may point to the previous URL of the resource. As an additional example, a user or administrator that inputs data into the metadata fields may not comply with guidelines of the schema or format of the metadata (e.g., by putting information on a webpage associated with the data set instead of within the metadata of the data set).

In addition to or alternatively to expanding the entries of the first database 120 to include the locations of the raw data of the data sets, the database management device 110 may update the first database 120 with field descriptors for the data fields of the raw data. In these and other embodiments, the descriptions of the data fields of the raw data may be stored in data dictionaries. For example, in a Project Open Data (POD) format, a "describedBy" API call may include an API call that identifies a location of a data dictionary. Other formats may store the information in a various fields of metadata (e.g., the "extras" field for a CKAN format) that may be identified. For other formats, one or more of the raw data files of the data set may be downloaded and the headers/names of the data fields may be extracted. Webpages or other resources associated with the data set may be crawled or searched for files or webpages that includes all of the header/names of the data fields, and such files and/or webpages may be considered as candidates for the data dictionary for the data set. In these and other embodiments, after obtaining or otherwise identifying the field descriptors from the data dictionary, the first database 120 may be updated with such information.

After construction of the first database 120, one or more processing tasks may be performed on one or more data sets prior to receiving a query from the user 150 that invokes such data sets. For example, the raw data of a given data set may be downloaded and imported into the second database 130. As another example, previews of the sample values of the raw data of the given data set may be generated (e.g., the name of data fields and the value of the first entry, such as the first row). Such a processing task may be performed without downloading the entire set of raw data. As another example, previews of the raw data of the given data set may be generated (e.g., graphical views of the data or other visualizations of the data may be generated). As an additional example, sample queries may be processed and the answers may be generated and stored such that if the sample query is received from the user 150, the answer may be provided quickly as that query has already been analyzed. As another example, various analyses of the raw data may be performed and stored. For example, functions such as averages, count, median, standard deviation, variation between data fields, minimum, maximum, histogram, etc. may be performed on the raw data, and the results stored. As an additional example, relationships between the data set and other data sets may be identified and mapped by the database management device 110. As another example, the database management device 110 may crawl webpages associated with a given data set in the data portal and/or an entrance page of the given data set to extract additional information which may not be defined in the existing metadata scheme. For example, the description of a resource shown on the web page and the name of the resource may be collected and recorded in additional fields of metadata for the given data set.

In some embodiments, a set of processing tasks may be performed by the database management device 110 on a given data set depending on the priority or popularity of the data set. For example, a given data set may be prioritized based on an expected level of use or access and/or a priority identifying importance of the data set. In these and other embodiments, the popularity may be based on a projection of expected use or based on numerically tracking actual queries, views, downloads, or other access requests that invoke the given data set. In some embodiments, for a highest priority data set, the set of processing tasks may include all or most of the tasks identified above, such as acquiring the raw data and importing the raw data into the second database 130, performing analyses (e.g., statistical analyses) on the raw data, generating visualizations of the raw data and/or the analyses performed on the raw data, processing sample queries associated with the raw data and storing the resulting response, mapping relationships with other data sets, etc. In some embodiments, for a lowest priority data set, the set of processing tasks may include maintaining the metadata in the first database 120 of the data set and not performing other processing. For example, the raw data may not be acquired for the lowest priority data set. In these and other embodiments, the processing task sets for data sets with priorities between the highest priority and the lowest priority may include any number of tasks. The higher priority data sets may include processing task sets with more processing tasks and/or more data-intensive or processing-intensive tasks, while the lower priority data sets may include processing task sets with fewer processing tasks and/or less data-intensive or processing-intensive tasks. In these and other embodiments, the output of the processing tasks may be stored in one of the first database 120 and/or the second database 130, depending on the task. For example, the performance of such processing tasks may be described with greater detail with reference to FIG. 3.

In some embodiments, the processing tasks may be scheduled by the database management device 110 based on any of a variety of factors. For example, the scheduling may be performed based on the priority of the task, the priority of the data set, the amount of processing involved in the task, the amount of data/bandwidth usage involved in the task, etc. In some embodiments, the tasks may be scheduled based on the cost of computing resources. For example, if the processing task includes the downloading of large amounts of data, the task may be performed or scheduled when network load is low (e.g., raw data may be scheduled to be downloaded between the hours of 2 AM and 4 AM). As another example, if the database management device 110 utilizes cloud computing to perform analyses, the task may be scheduled when the cost of such cloud computing resources is low (e.g., when demand for computing resources is low, the cost for such cloud computing resources also is low for variable-priced cloud computing resources). The scheduling of such processing tasks may be described with greater detail with respect to FIG. 4.

In some embodiments, the database management device 110 may periodically monitor the source of the raw data such that if the raw data is updated, new processing tasks may be scheduled. For example, the database management device 110 may schedule tasks to download the updated raw data, perform additional processing tasks on the newly-acquired raw data, etc. In these and other embodiments, the detection of an update to a data set may depend on the information listed in the metadata. For example, the information of the time about the last update may be compared with the information in the first database 120 by the database management device 110. Another example of detecting an update of a data set may depend on the computation of a checksum of a web page describing the data set. When the checksum is different from a recorded checksum, the database management device 110 may analyze the web pages associated with the data set to search for updated raw data.

In some embodiments, the database management device 110 may be configured to receive queries from the user 150 and respond to the queries using the first database 120 and/or the second database 130. In some embodiments, the database management device 110 may utilize a database query protocol or language, such as SPARQL Protocol and RDF Query Language (SPARQL), via which a particular data set and/or portion of raw data may be identified and utilized to respond to the query. In these and other embodiments, the database management device 110 may respond with a subset or analyzed version of raw data rather than a block of raw data. For example, if a query from the user 150 asked what the average rainfall was in a given city for a three year window, the database management device 110 may return a single numerical value of the average rainfall rather than all the raw data to allow the user 150 to determine the average.

In some embodiments, the database management device 110 may utilize a user interface via which the user 150 may submit queries. Such a user interface may include a chat bot via which the database management device 110 may provide confirmation questions, may clarify the query of the user 150, may provide sample raw data to the user 150 to confirm the identified raw data represents the expected raw data, etc.

In some embodiments, the database management device 110 may convert plain-language queries from the user 150 into a database inquiry (e.g., from plain language into a SPARQL inquiry). In these and other embodiments, the database management device 110 may seek feedback from the user 150 regarding the quality of the response and/or the correctness of the data set/raw data used. Based on the user response, the database management device 110 may modify or adjust future responses to future queries to better correlate with the responses or data expected by the user 150. Using such an approach, the database management device 110 may implement machine learning to provide better responses to queries.

The network 160 may be utilized to facilitate communication between the various components of the system 100. The network 160 may be implemented as a conventional type network, a wired or wireless network, and/or may have any of numerous different configurations or combinations thereof. Furthermore, the network 160 may include a local area network (LAN), a wide area network (WAN) (e.g., the Internet), or other interconnected data paths across which multiple devices and/or entities may communicate. In some embodiments, the network 160 may include a peer-to-peer network. The network 160 may also be coupled to or may include portions of a telecommunications network for sending data in a variety of different communication protocols. In some embodiments, the network 160 may include Bluetooth® communication networks or cellular communication networks for sending and receiving communications and/or data including via short message service (SMS), multimedia messaging service (MMS), hypertext transfer protocol (HTTP), direct data connection, wireless application protocol (WAP), e-mail, or other approaches. The network 160 may also include a mobile data network that may include third-generation (3G), fourth-generation (4G), long-term evolution (LTE), long-term evolution advanced (LTE-A), Voice-over-LTE ("VoLTE") or any other mobile data network or combination of mobile data networks.

Modifications, additions, or omissions may be made to the system 100 without departing from the scope of the present disclosure. For example, the system 100 may include any number of computing devices connected in any manner. In many cases, the system 100 may include more computing devices than illustrated and may serve a large number of data sets.

Figure 2:
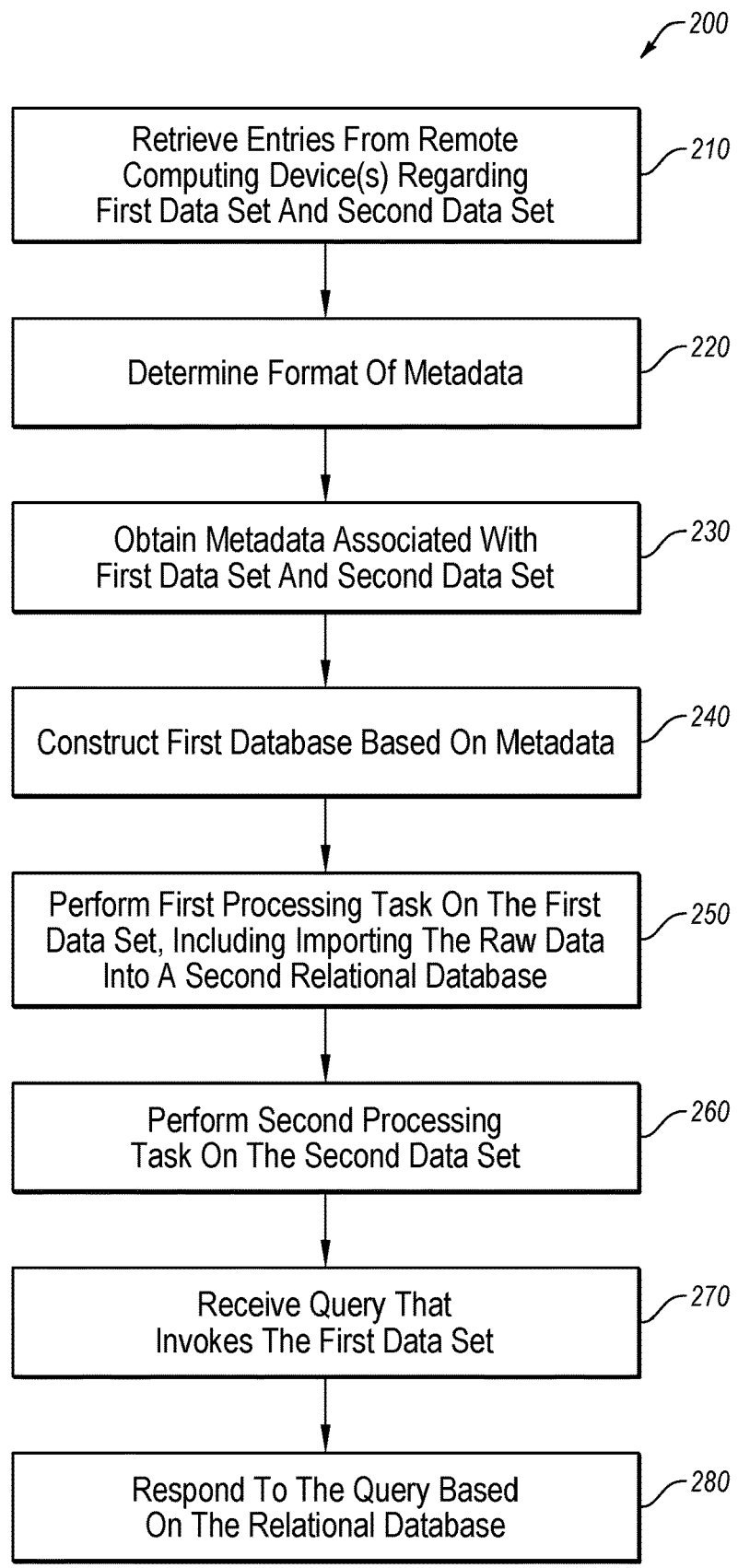
FIG. 2 illustrates a flowchart of an example method of utilizing a multi-database system.
Figure 3:
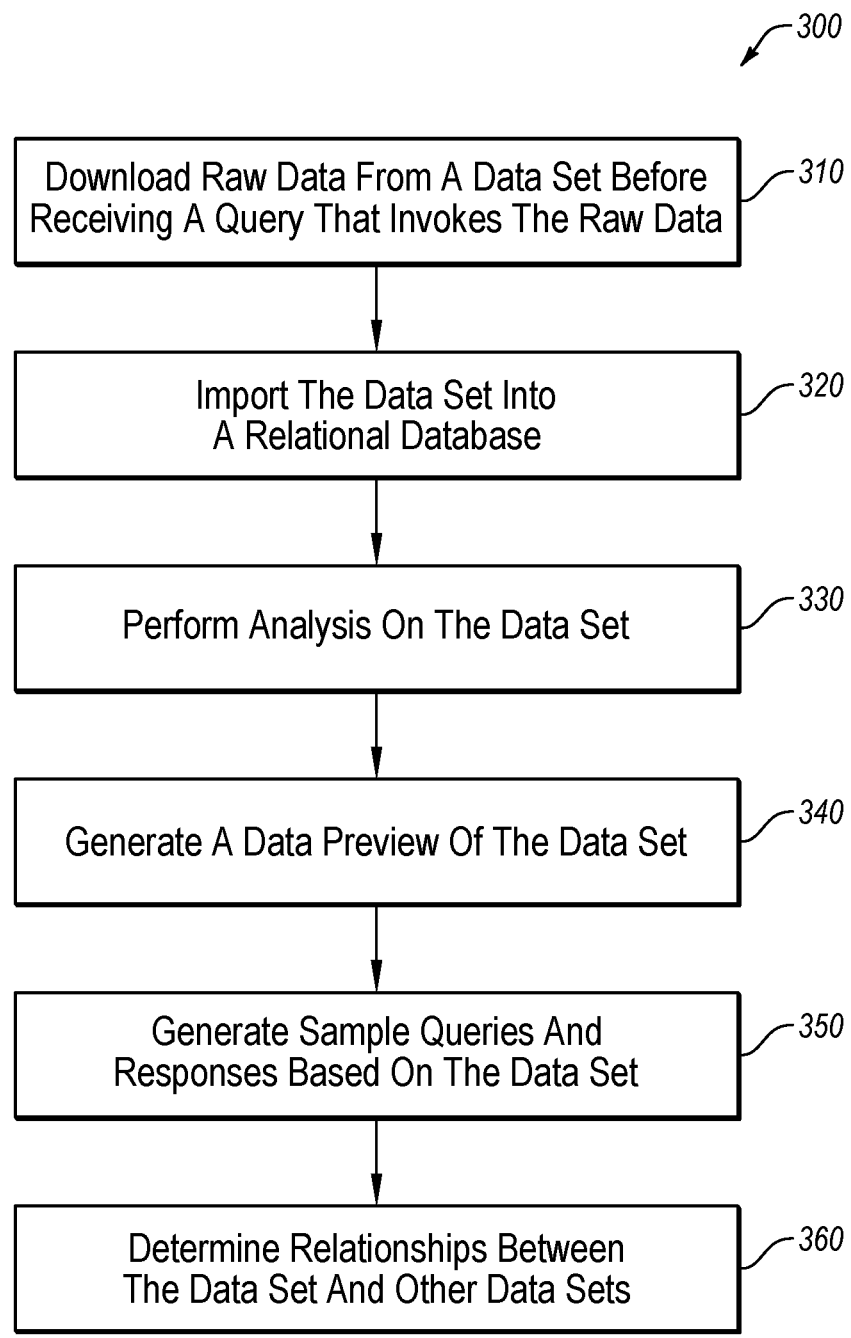
FIG. 3 illustrates a flowchart of an example method of processing that may be performed on a data set.
Figure 4:
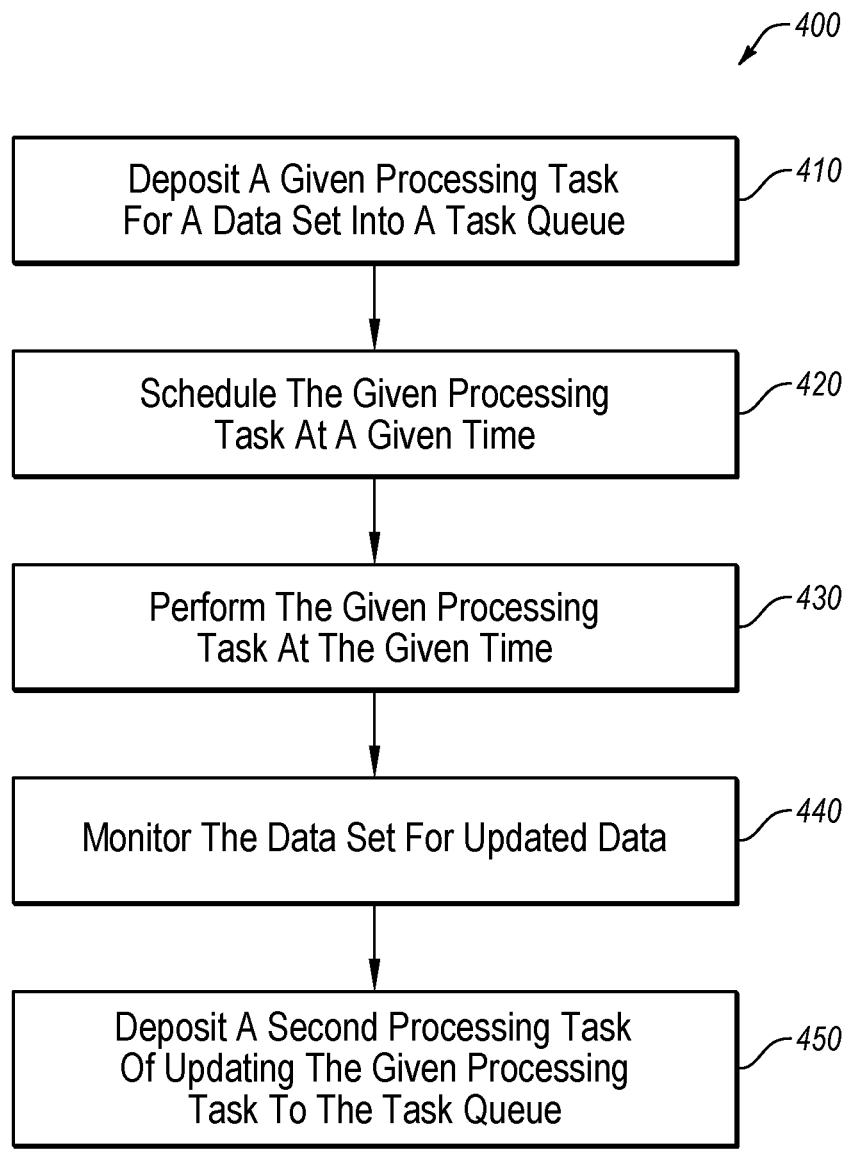
FIG. 4 illustrates a flowchart of an example method of scheduling processing tasks.

For each of the methods illustrated in FIGS. 2-4, the methods may be performed by any suitable system, apparatus, or device. For example, the system 100 or any of the database management device 110, databases 120, 130, and/or remote computing devices 140a-n of FIG. 1, or other systems or devices, may perform one or more of the operations associated with the methods. Although illustrated with discrete blocks, the steps and operations associated with one or more of the blocks of the methods may be divided into additional blocks, combined into fewer blocks, or eliminated, depending on the desired implementation.

Additionally, for each of the methods illustrated in FIGS. 2-4, modifications, additions, or omissions may be made to the methods without departing from the scope of the present disclosure. For example, the operations of the methods may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

FIG. 2 illustrates a flowchart of an example method 200 of utilizing a multi-database system, in accordance with one or more embodiments of the present disclosure. For example, a database management device may perform the method 200 to construct multiple databases and use the databases to respond to queries.

At block 210, entries may be retrieved from one or more remote computing devices regarding a first data set and a second data set. For example, a database management device (such as the database management device 110 of FIG. 1) may access a project or other resource that includes listings of one or more data portals and/or data sets accessible via the data portals. In these and other embodiments, the entries identifying the data portals and/or data sets may be retrieved such that the various data portals and/or data sets may be accessed. In some embodiments, the entries may list data portals from which the first data set and/or the second data set may be accessed.

At block 220, a determination may be made regarding the format of the metadata generator for the data sets in the data portals. For example, the database management device may parse the entries to identify the format of the metadata generator for the datasets in the data portal. As another example, the database management device may crawl or otherwise perform a keyword search for such formats. As an additional example, the database management device may submit an API call associated with a given format to the data portal to determine if the data portal understands and/or is responsive to the API call.

At block 230, the metadata associated with the first data set and the second data set may be obtained. For example, the database management device may access the data portal to download or otherwise acquire the metadata associated with the first data set and the second data set. In some embodiments, obtaining the metadata may include submitting an API call to the data portal in a format consistent with the format utilized by the data portal.

At block 240, a first database may be constructed based on the metadata of the first and second data sets. For example, the database management device may utilize the metadata of the first and/or the second data set to import the metadata obtained at block 230 into the first database. In some embodiments, the first database may include a graph database.

At block 250, a first processing task may be performed on the first data set. In these and other embodiments, the first processing task may include importing the raw data into a second database. The second database may include a relational database. In some embodiments, the first processing task may include any combination of processing tasks described in the present disclosure, such as acquiring raw data, statistical analysis, visualization, sample query generation, etc. FIG. 3 may illustrate an example set of processing tasks implemented as the first processing task.

At block 260, a second processing task may be performed on the second data set that is different from the first processing task. For example, if the first data set includes a high priority data set, the first processing task may include all of the operations identified in FIG. 3 while the second data set may include fewer than all of the operations identified in FIG. 3. As another example, the second data set may include maintaining the metadata of the second data set without acquiring the raw data of the second data set.

In some embodiments, the first processing task of the block 250 and the second processing task of the block 260 may be performed preemptively, e.g., before receiving an inquiry from a user that invokes the first data set or the second data set, or performed independent of whether or not a query is received.

At block 270, a query may be received that invokes the first data set. For example, a user (such as the user 150 of FIG. 1) may submit a query to the database management device that is answerable using the first data set. In some embodiments, the user may interact with the database management device via a user interface that utilizes a chat bot.

At block 280, a response may be provided to the query based on the second relational database. In these and other embodiments, the database management device may analyze the raw data of the first data set and/or otherwise perform some analysis to generate the response to the query based on receiving the query. Additionally or alternatively, the response may be generated as one of the processing tasks of the block 250 if the query corresponds to an estimated query for which a response was pre-generated. In such an embodiment, the database management device may provide the response quickly as the processing and/or analysis to generate the response was performed prior to receiving the query.

FIG. 3 illustrates a flowchart of an example method 300 of processing that may be performed on a data set, in accordance with one or more embodiments of the present disclosure. For example, a database management device may perform the method 300 to perform a set of processing tasks on the data set. The method 300 may illustrate a robust set of processing tasks, such as the set of processing tasks that may be performed on a high priority data set. In some embodiments, a reduced number of the operations of the method 300 may be performed for lower priority data sets.

At block 310, raw data from a data set may be downloaded before receiving a query that invokes the raw data. For example, a database management device (such as the database management device 110 of FIG. 1) may download the raw data as part of a set of processing tasks that are performed before receiving a query regarding the data set.

At block 320, the data set may be imported into a relational database. For example, the database management device may utilize relationships between and among the data fields and/or data sets to import the raw data into the relational database.

At block 330, an analysis may be performed on the data set. Such an analysis may include performing a statistical function such as average, count, median, standard deviation, variation between data fields, maximum, minimum, histogram, etc. on one or more fields of the raw data of the data set. In these and other embodiments, the result of the analysis may be stored in any form of database, such as the relational database and/or a graph database.

At block 340, a data preview of the data set may be generated. For example, a visualization, such as a graph depiction, of one or more data fields may be generated. Additionally or alternatively, a visualization of the result of the analysis of the block 330 may be generated. In some examples, a subset of the raw data may be extracted and stored in such a manner that the subset of the raw data may be presented as a representative sample of the raw data. For example, such a representative sample may be provided to a user to verify that the data set is a desired data set for responding to a query of the user.

At block 350, sample queries and associated responses based on the data set may be generated. Such sample queries may include frequently accessed or frequently sought information (e.g., what is the average price of gasoline for a given year). Additionally or alternatively, the sample queries may include frequently performed operations (e.g., what is the average . . . , what is the highest . . . , etc.). In some embodiments, the sample queries may be based at least in part on one or more of the analyses performed at the block 330. In these and other embodiments, the results may be stored in the relational database such that if a query that corresponds to the sample query is received, the response may be provided with little or no additional data processing, acquisition, or analysis.

At block 360, relationships between the data set and other data sets may be determined. For example, in the relational database, one data set may be identified as being a super-set of another data set (e.g., national data for a given topic while the other data set is regional data for the same topic), as being correlated in time with another data set (e.g., data covering the same date ranges), or any other relationship. In some embodiments, the relationships may be numerically based, for example, by performing various statistical analyses on two data sets to determine if they follow a similar trajectory, if the raw data is similar, etc. In some embodiments, based on the metadata of the data set (e.g., the description of the data set and/or the data dictionary), multiple categories may be assigned to the data set. Such category may be geographically related, chronologically related, topically related, etc. In these and other embodiments, multiple data sets under the same category may be connected and their relationships may be determined based on the categorical connections.

FIG. 4 illustrates a flowchart of an example method 400 of scheduling processing tasks, in accordance with one or more embodiments of the present disclosure. For example, a database management device may perform the method 400 to schedule and/or perform various processing tasks on a data set.

At block 410, a given processing task for a data set may be deposited into a task queue. For example, any of the processing tasks described above with reference to FIG. 3 may be deposited into a task queue maintained by a database management device. In some embodiments, each task in the queue may include an associated amount of processing and/or data acquisition utilized in performing the given processing task as an estimated computing cost associated with the respective tasks. Additionally or alternatively, the task may be given a priority. Such a priority may be based on a priority of the data set upon which the given processing task may be performed, a priority specific to the given processing task, a user-set priority, or any other factor.

At block 420, the given processing task may be scheduled at a given time. In some embodiments, the given processing task may be scheduled based on costs associated with performing the given processing task. For example, historical trends of network usage and/or computing costs may be analyzed and a time of low cost to utilize the computing resources (e.g., low network usage) may be selected as the given time. In some embodiments, the given processing task may be scheduled based on priority of the given task. For example, for higher priority tasks, a higher computing cost may be tolerated to perform the task sooner, while for lower priority tasks, such tasks may be postponed until a time of low cost for computing resources. In some embodiments, the given processing task may be scheduled based on both the costs associated with the given processing task and the priority of the given processing task.

At block 430, the given processing task may be performed at the given time. For example, the database management device may perform the given processing task on the data set.

At block 440, the data set may be monitored for updated data. In some embodiments, the database management device may periodically query the original source of the raw data to determine whether or not the data set has been updated. Such a determination may be based on a revision date or version in metadata of the data set as stored at the original source of the data set. Additionally or alternatively, an updated checksum based on raw data and/or a web page of the data set may be compared with a previously generated checksum as generated and stored during a previous check for updates or an original checksum. Additionally or alternatively, a sample of raw data as stored in the relational database may be compared with the raw data as stored in the original source of the raw data.

At block 450, a second processing task of updating the given processing task may be deposited in the task queue. For example, based on determining that the data set has been updated, a database management device may deposit a task that updates previously-performed processing tasks for the data set such that the analyses stored by the database management device reflect the updated data set.

Figure 5:
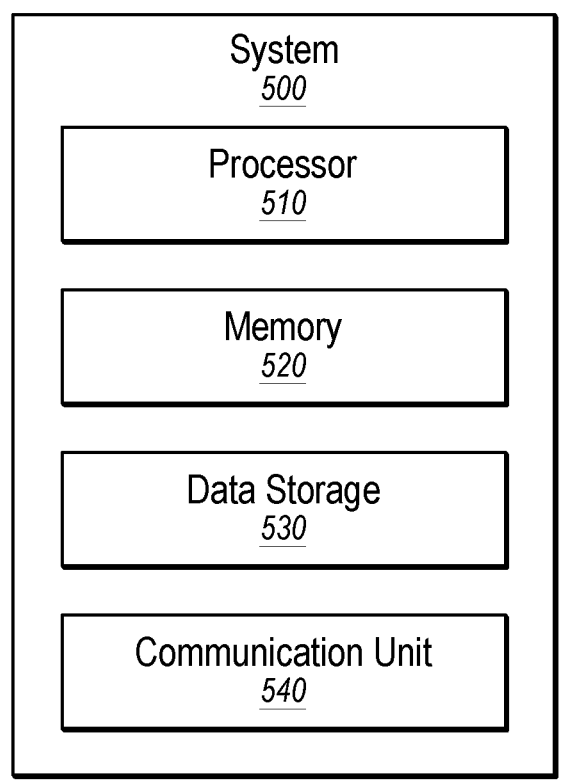
FIG. 5 illustrates an example computing system.

FIG. 5 illustrates an example computing system 500, according to at least one embodiment described in the present disclosure. Any of the computing devices or databases of FIG. 1, including the database management device 110, the first database 120, the second database 130, and the remote computing device 140, may be implemented as a computing system such as the computing system 500. The system 500 may include any suitable system, apparatus, or device configured to communicate over a network. The computing system 500 may include a processor 510, a memory 520, a data storage 530, and a communication unit 540, which all may be communicatively coupled. The data storage 530 may include various types of data, such as data sets, metadata, databases, etc.

Generally, the processor 510 may include any suitable special-purpose or general-purpose computer, computing entity, or processing device including various computer hardware or software modules and may be configured to execute instructions stored on any applicable computer-readable storage media. For example, the processor 510 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 5, it is understood that the processor 510 may include any number of processors distributed across any number of network or physical locations that are configured to perform individually or collectively any number of operations described in the present disclosure. In some embodiments, the processor 510 may interpret and/or execute program instructions and/or process data stored in the memory 520, the data storage 530, or the memory 520 and the data storage 530. In some embodiments, the processor 510 may fetch program instructions from the data storage 530 and load the program instructions into the memory 520.

After the program instructions are loaded into the memory 520, the processor 510 may execute the program instructions, such as instructions to perform the methods 200, 300, and/or 400 of FIGS. 2, 3, and 4, respectively. For example, the processor 510 may obtain instructions regarding constructing one or more databases and/or responding to one or more queries using the databases.

The memory 520 and the data storage 530 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 510. In some embodiments, the computing system 700 may or may not include either of the memory 520 and the data storage 530.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 510 to perform a certain operation or group of operations.

The communication unit 540 may include any component, device, system, or combination thereof that is configured to transmit or receive information over a network. In some embodiments, the communication unit 540 may communicate with other devices at other locations, the same location, or even other components within the same system. For example, the communication unit 540 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 540 may permit data to be exchanged with a network and/or any other devices or systems described in the present disclosure. For example, the communication unit 540 may allow the system 500 to communicate with other systems, such as computing devices and/or other networks.

Modifications, additions, or omissions may be made to the system 500 without departing from the scope of the present disclosure. For example, the data storage 530 may be multiple different storage mediums located in multiple locations and accessed by the processor 510 through a network.

As indicated above, the embodiments described in the present disclosure may include the use of a special purpose or general purpose computer (e.g., the processor 510 of FIG. 5) including various computer hardware or software modules, as discussed in greater detail below. Further, as indicated above, embodiments described in the present disclosure may be implemented using computer-readable media (e.g., the memory 520 or data storage 530 of FIG. 5) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
    obtaining metadata associated with a first data set and a second data set, the first and second data sets stored at one or more remote computing devices;
    constructing a first database based on the metadata of the first and second data sets;
    performing a first processing task on the first data set, the first processing task including:
        obtaining first raw data of the first data set;
        importing the first raw data of the first data set into a second database, the second database configured as a relational database;
        generating relationships in the second database between entries of the first data set to facilitate anticipated responses to queries;
        delaying acquisition of second raw data of the second data set to be imported into the second database until after a second data set query is received that invokes the second data set the delaying based on a priority of the second data set being lower than a priority of the first data set;
    after performing the first processing task, receiving a query that invokes the first data set; and
    responding to the query at least based on the relationships generated in the second database.

2. The method of claim 1, wherein the first processing task is performed on the first data set based on a priority of the first data set being higher than a priority of the second data set.

3. The method of claim 2, wherein the priority of the first data set is based on at least one of a number of views or downloads of the first data set, a metadata field of the first data set indicating a popularity of the first data set, or a number of queries received directed to the first data set.

4. The method of claim 1, wherein the first processing task further includes:
- evaluating relationships between the first data set and the second data set; and
- generating sample queries and associated answers corresponding to the first data set.

5. The method of claim 1, wherein at least a portion of the first processing task is performed at a time based on a cost of processing power.

6. The method of claim 1, wherein responding to the query includes responding with processed raw data of the first data set rather than raw data of the first data set.

7. The method of claim 1, wherein performing either of the first processing task or the second processing task includes:
- depositing a given processing task into a task queue;
- scheduling the given processing task at a given time based on priority of the given processing task and a computing cost associated with performing the given processing task;
- performing the given processing task at the given time;
- monitoring the first data set for updated data; and
- based on updated data in the first data set, depositing a second given processing task in the task queue, the second given processing task related to updating the given processing task.

8. The method of claim 1, wherein:
- the metadata of the first data set is in a first format and the metadata of the second data set is in a second format different from the first format; and
- constructing the first database includes converting at least one of the metadata of the first data set and the metadata of the second data set into a common format, the common format used for metadata of all data sets stored in the first database.

9. The method of claim 1, wherein obtaining the metadata of the first data set includes identifying locations of raw data at the one or more remote computing devices by one of a keyword search or crawling webpages associated with the first data set for files with a target file type.

10. The method of claim 9, wherein the target file type includes one of a comma-separated values (CSV) type, a JavaScript Object Notation (JSON) type, an Extensible Markup Language (XML) type, a resource description framework (RDF) type, a spreadsheet type, a portable document format (PDF) type, or a compressed file type.

11. A non-transitory computer-readable medium containing instructions that, when executed by a processor, are configured to cause a system to perform operations, the operations comprising:
- obtaining metadata associated with a first data set and a second data set, the first and second data sets stored at one or more remote computing devices;
- constructing a first database based on the metadata of the first and second data sets;
- performing a first processing task on the first data set, the first processing task including:
  - obtaining first raw data of the first data set;
  - importing the first raw data of the first data set into a second database, the second database configured as a relational database;
  - generating relationships in the second database between entries of the first data set to facilitate anticipated responses to queries;
- delaying acquisition of second raw data of the second data set to be imported into the second database until after a second data set query is received that invokes the second data set the delaying based on a priority of the second data set being lower than a priority of the first data set;
- after performing the first processing task, receiving a query that invokes the first data set; and
- responding to the query at least based on the relationships generated in the second database.

12. The computer-readable medium of claim 11, wherein the first processing task is performed on the first data set based on a priority of the first data set being higher than a priority of the second data set.

13. The computer-readable medium of claim 12, wherein the priority of the first data set is based on at least one of a number of views or downloads of the first data set, a metadata field of the first data set indicating a popularity of the first data set, or a number of queries received directed to the first data set.

14. The computer-readable medium of claim 11, wherein the first processing task further includes:
- evaluating relationships between the first data set and the second data set; and generating sample queries and associated answers corresponding to the first data set.

15. The computer-readable medium of claim 11, wherein at least a portion of the first processing task is performed at a time based on a cost of processing power.

16. The computer-readable medium of claim 11, wherein responding to the query includes responding with processed raw data of the first data set rather than raw data of the first data set.

17. The computer-readable medium of claim 11, wherein performing the processing task includes:
- depositing a given processing task into a task queue;
- scheduling the given processing task at a given time based on priority of the given processing task and a computing cost associated with performing the given processing task;
- performing the given processing task at the given time;
- monitoring the first data set for updated data; and
- based on updated data in the first data set, depositing a second given processing task in the task queue, the second given processing task related to updating the given processing task.

18. The computer-readable medium of claim 11, wherein:
- the metadata of the first data set is in a first format and the metadata of the second data set is in a second format different from the first format; and
- constructing the first database includes converting at least one of the metadata of the first data set and the metadata of the second data set into a common format, the common format used for metadata of all data sets stored in the first database.

19. The computer-readable medium of claim 11, wherein obtaining the metadata of the first data set includes identifying locations of raw data at the one or more remote computing devices by one of a keyword search or crawling webpages associated with the first data set for files with a target file type.

20. A system comprising:
- a processor; and
- a non-transitory computer-readable medium containing instructions that, when executed by the processor, are configured to cause the system to perform operations, the operations comprising:
  - obtaining metadata associated with a first data set and a second data set, the first and second data sets stored at one or more remote computing devices;

constructing a first database based on the metadata of the first and second data sets;

performing a first processing task on the first data set, the first processing task including:
- obtaining first raw data of the first data set;
- importing the first raw data of the first data set into a second database, the second database configured as a relational database;
- generating relationships in the second database between entries of the first data set to facilitate anticipated responses to queries;

delaying acquisition of second raw data of the second data set to be imported into the second database until after a second data set query is received that invokes the second data set the delaying based on a priority of the second data set being lower than a priority of the first data set;

after performing the first processing task, receiving a query that invokes the first data set; and responding to the query at least based on the relationships generated in the second database.

\* \* \* \* \*